(12) United States Patent
Thomas

(10) Patent No.: US 8,931,500 B2
(45) Date of Patent: Jan. 13, 2015

(54) TWO HANDLE CENTERSET FAUCET

(75) Inventor: Kurt Judson Thomas, Indianapolis, IN (US)

(73) Assignee: Masco Corporation of Indiana, Indianapolis, IN (US)

( * ) Notice: Subject to any disclaimer, the term of this patent is extended or adjusted under 35 U.S.C. 154(b) by 493 days.

(21) Appl. No.: 13/399,940

(22) Filed: Feb. 17, 2012

(65) Prior Publication Data

US 2013/0213509 A1    Aug. 22, 2013

(51) Int. Cl.
*E03C 1/048* (2006.01)
*E03C 1/05* (2006.01)
*F16K 11/20* (2006.01)

(52) U.S. Cl.
USPC ............ 137/15.18; 137/315.12; 137/603; 137/801; 4/678

(58) Field of Classification Search
USPC .............. 137/315.12, 15.18, 603, 801, 359; 4/678
See application file for complete search history.

(56) References Cited

U.S. PATENT DOCUMENTS

| | | | |
|---|---|---|---|
| 2,200,091 A | 5/1940 | Kovach | |
| 2,219,471 A | 10/1940 | Davis | |
| 2,546,327 A | 3/1951 | Young | |
| 2,548,933 A | 4/1951 | Barnett | |
| 2,781,786 A | 2/1957 | Young | |
| 2,884,007 A | 4/1959 | Green | |
| 3,229,710 A | 1/1966 | Keller, III | |
| 3,422,849 A | 1/1969 | Manoogian | |
| 3,448,768 A | 6/1969 | Keller | |
| 3,505,098 A | 4/1970 | Miller et al. | |
| 3,520,325 A | 7/1970 | Stuart | |
| 3,580,289 A | 5/1971 | James et al. | |
| 3,590,876 A | 7/1971 | Young | |
| 3,600,723 A | 8/1971 | Mongerson et al. | |
| 3,635,405 A | 1/1972 | Shames et al. | |
| 3,645,493 A | 2/1972 | Manoogian et al. | |
| 3,714,958 A | 2/1973 | Johnson et al. | |
| 3,736,959 A | 6/1973 | Parkison | |
| 3,757,824 A | 9/1973 | Parkhurst et al. | |
| 3,770,004 A | 11/1973 | Johnson et al. | |
| 3,788,601 A | 1/1974 | Schmitt | |
| 3,796,380 A | 3/1974 | Johnson et al. | |
| 3,807,453 A | 4/1974 | Dom et al. | |
| 3,810,602 A | 5/1974 | Parkinson | |
| 3,834,416 A | 9/1974 | Parkison | |
| 3,854,493 A | 12/1974 | Farrell | |
| 3,929,317 A | 12/1975 | Cohn et al. | |
| 3,960,016 A | 6/1976 | Symmons | |

(Continued)

FOREIGN PATENT DOCUMENTS

| | | |
|---|---|---|
| CN | 101016954 A | 8/2007 |
| CN | 201129425 Y | 10/2008 |

(Continued)

OTHER PUBLICATIONS

Dadex Polydex—PPR Pipe System for Hot and Cold Water Supply and Distribution, 2005, 2 pgs.

(Continued)

*Primary Examiner* — Kevin Lee
(74) *Attorney, Agent, or Firm* — Faegre Baker Daniels LLP

(57) ABSTRACT

A centerset faucet includes an upper support receiving a waterway including first and second valve interfaces. A lower base is coupled to the upper support, wherein a reentrant edge of the lower base is formed over a bottom lip of the upper support to secure the base thereto.

22 Claims, 8 Drawing Sheets

(56) References Cited

U.S. PATENT DOCUMENTS

| | | | |
|---|---|---|---|
| 3,965,936 A | 6/1976 | Lyon | |
| 3,989,787 A | 11/1976 | Scott, Jr. et al. | |
| 3,998,240 A | 12/1976 | Liautaud | |
| 4,026,328 A | 5/1977 | Nelson | |
| 4,058,289 A | 11/1977 | Hicks | |
| 4,076,279 A | 2/1978 | Klotz et al. | |
| 4,103,709 A | 8/1978 | Fischer | |
| 4,130,136 A | 12/1978 | Garnier et al. | |
| 4,221,338 A | 9/1980 | Shames et al. | |
| 4,316,870 A | 2/1982 | Rowley | |
| 4,331,176 A * | 5/1982 | Parkison | 137/454.5 |
| 4,337,795 A | 7/1982 | Argyris et al. | |
| 4,356,574 A | 11/1982 | Johnson | |
| 4,357,957 A | 11/1982 | Bisonaya et al. | |
| 4,387,738 A | 6/1983 | Bisonaya et al. | |
| 4,397,330 A | 8/1983 | Hayman | |
| 4,415,389 A | 11/1983 | Medford et al. | |
| 4,446,084 A | 5/1984 | Rowley | |
| 4,453,567 A | 6/1984 | MacDonald | |
| 4,458,839 A | 7/1984 | MacDonald | |
| 4,465,259 A | 8/1984 | Allen et al. | |
| 4,484,600 A | 11/1984 | Peterson et al. | |
| 4,502,507 A | 3/1985 | Hayman | |
| 4,513,769 A | 4/1985 | Purcell | |
| 4,525,136 A | 6/1985 | Rowley | |
| 4,552,171 A | 11/1985 | Farrell et al. | |
| 4,577,835 A | 3/1986 | Holycross | |
| 4,580,601 A | 4/1986 | Schlotman et al. | |
| 4,592,388 A | 6/1986 | Wilcox | |
| 4,604,202 A | 8/1986 | Movshovitz | |
| 4,607,659 A | 8/1986 | Cole | |
| 4,610,429 A | 9/1986 | Arnold et al. | |
| 4,626,005 A | 12/1986 | Stifter | |
| 4,635,673 A | 1/1987 | Gerdes | |
| 4,649,958 A | 3/1987 | Purcell | |
| 4,651,770 A | 3/1987 | Denham et al. | |
| 4,652,263 A | 3/1987 | Herweck et al. | |
| 4,664,423 A | 5/1987 | Rowley | |
| 4,667,987 A | 5/1987 | Knebel | |
| 4,671,316 A | 6/1987 | Botnick | |
| 4,687,025 A | 8/1987 | Kahle et al. | |
| 4,700,928 A | 10/1987 | Marty | |
| 4,708,172 A | 11/1987 | Riis | |
| 4,749,003 A | 6/1988 | Leason | |
| 4,754,783 A | 7/1988 | Knapp | |
| 4,754,993 A | 7/1988 | Kraynick | |
| 4,760,871 A | 8/1988 | Vijay | |
| 4,762,143 A | 8/1988 | Botnick | |
| 4,773,348 A | 9/1988 | Rowley | |
| 4,783,303 A | 11/1988 | Imgram | |
| 4,793,375 A | 12/1988 | Marty | |
| 4,803,033 A | 2/1989 | Rowley | |
| 4,838,304 A | 6/1989 | Knapp | |
| 4,853,164 A | 8/1989 | Kiang et al. | |
| 4,877,660 A | 10/1989 | Overbergh et al. | |
| 4,887,642 A | 12/1989 | Bernat | |
| 4,942,644 A | 7/1990 | Rowley | |
| 4,957,135 A | 9/1990 | Knapp | |
| 4,971,112 A | 11/1990 | Knapp | |
| 4,979,530 A | 12/1990 | Breda | |
| 4,981,156 A | 1/1991 | Nicklas et al. | |
| 5,001,008 A | 3/1991 | Tokita et al. | |
| 5,006,207 A | 4/1991 | Peterman et al. | |
| 5,024,419 A | 6/1991 | Mulvey | |
| 5,027,851 A | 7/1991 | Drees et al. | |
| 5,053,097 A | 10/1991 | Johansson et al. | |
| 5,090,062 A | 2/1992 | Hochstrasser | |
| 5,095,554 A | 3/1992 | Gloor | |
| 5,100,565 A | 3/1992 | Fujiwara et al. | |
| 5,110,044 A | 5/1992 | Bergmann | |
| 5,127,814 A | 7/1992 | Johnson et al. | |
| 5,131,428 A | 7/1992 | Bory | |
| 5,135,022 A | 8/1992 | Kovey et al. | |
| 5,148,837 A | 9/1992 | Ågren et al. | |
| 5,150,922 A | 9/1992 | Nakashiba et al. | |
| 5,174,324 A | 12/1992 | Chrysler | |
| 5,219,185 A | 6/1993 | Oddenino | |
| 5,279,333 A | 1/1994 | Lawrence | |
| 5,340,018 A | 8/1994 | Macdonald et al. | |
| 5,355,906 A | 10/1994 | Marty et al. | |
| 5,364,135 A | 11/1994 | Anderson | |
| 5,366,253 A | 11/1994 | Nakashiba et al. | |
| 5,375,889 A | 12/1994 | Nakashiba et al. | |
| 5,397,102 A | 3/1995 | Kingman | |
| 5,402,827 A | 4/1995 | Gonzalez | |
| 5,417,242 A | 5/1995 | Goncze | |
| 5,437,345 A | 8/1995 | Schmidt et al. | |
| 5,493,873 A | 2/1996 | Donselman et al. | |
| 5,494,259 A | 2/1996 | Peterson | |
| 5,518,027 A | 5/1996 | Saiki et al. | |
| 5,527,503 A | 6/1996 | Rowley | |
| 5,553,935 A | 9/1996 | Burnham et al. | |
| 5,555,912 A | 9/1996 | Saadi et al. | |
| 5,558,128 A | 9/1996 | Pawelzik et al. | |
| 5,566,707 A | 10/1996 | Ching et al. | |
| 5,573,037 A | 11/1996 | Cole et al. | |
| 5,577,393 A | 11/1996 | Donselman et al. | |
| 5,579,808 A | 12/1996 | Mikol et al. | |
| 5,582,438 A | 12/1996 | Wilkins et al. | |
| 5,586,746 A | 12/1996 | Humpert et al. | |
| 5,611,093 A | 3/1997 | Barnum et al. | |
| 5,615,709 A | 4/1997 | Knapp | |
| 5,622,210 A | 4/1997 | Crisman et al. | |
| 5,622,670 A | 4/1997 | Rowley | |
| 5,642,755 A | 7/1997 | Mark et al. | |
| 5,660,692 A | 8/1997 | Nesburn et al. | |
| 5,669,407 A | 9/1997 | Bailey | |
| 5,669,417 A | 9/1997 | Lian-Jie | |
| 5,669,595 A | 9/1997 | Bytheway | |
| 5,685,341 A | 11/1997 | Chrysler et al. | |
| 5,687,952 A | 11/1997 | Arnold et al. | |
| 5,692,536 A | 12/1997 | Tokarz | |
| 5,695,094 A | 12/1997 | Burnham et al. | |
| 5,725,008 A | 3/1998 | Johnson | |
| 5,725,010 A | 3/1998 | Marty et al. | |
| 5,730,173 A | 3/1998 | Sponheimer | |
| 5,741,458 A | 4/1998 | Rowley | |
| 5,746,244 A | 5/1998 | Woolley, Sr. et al. | |
| 5,756,023 A | 5/1998 | Stachowiak | |
| 5,758,690 A | 6/1998 | Humpert et al. | |
| 5,775,587 A | 7/1998 | Davis | |
| 5,803,120 A | 9/1998 | Bertoli | |
| 5,813,435 A | 9/1998 | Knapp | |
| 5,832,952 A | 11/1998 | Cook et al. | |
| 5,833,279 A | 11/1998 | Rowley | |
| 5,850,855 A | 12/1998 | Kerschbaumer et al. | |
| 5,857,489 A | 1/1999 | Chang | |
| 5,861,200 A | 1/1999 | Rowley | |
| 5,865,473 A | 2/1999 | Semchuchk et al. | |
| 5,875,809 A | 3/1999 | Barrom | |
| 5,893,387 A | 4/1999 | Paterson et al. | |
| 5,895,695 A | 4/1999 | Rowley | |
| 5,916,647 A | 6/1999 | Weinstein | |
| 5,924,451 A | 7/1999 | Kuo | |
| 5,927,333 A | 7/1999 | Grassberger | |
| 5,931,374 A | 8/1999 | Knapp | |
| 5,934,325 A | 8/1999 | Brattoli et al. | |
| 5,937,892 A | 8/1999 | Meisner et al. | |
| 5,944,225 A | 8/1999 | Kawolics | |
| 5,950,663 A | 9/1999 | Bloomfield | |
| 5,960,490 A | 10/1999 | Pitch | |
| 5,965,077 A | 10/1999 | Rowley et al. | |
| 5,975,143 A | 11/1999 | Järvenkylä et al. | |
| 5,979,489 A | 11/1999 | Pitch | |
| 6,013,382 A | 1/2000 | Coltrinari et al. | |
| 6,023,796 A | 2/2000 | Pitch | |
| 6,029,860 A | 2/2000 | Donselman et al. | |
| 6,029,948 A | 2/2000 | Shafer | |
| 6,044,869 A | 4/2000 | Koob | |
| 6,053,214 A | 4/2000 | Sjoberg et al. | |
| 6,062,251 A | 5/2000 | Pitch | |
| 6,070,614 A | 6/2000 | Holzheimer et al. | |
| 6,070,916 A | 6/2000 | Rowley | |
| 6,073,972 A | 6/2000 | Rivera | |

(56) References Cited

U.S. PATENT DOCUMENTS

| | | |
|---|---|---|
| 6,079,447 A | 6/2000 | Holzheimer et al. |
| 6,082,407 A | 7/2000 | Paterson et al. |
| 6,082,780 A | 7/2000 | Rowley et al. |
| 6,085,784 A | 7/2000 | Bloom et al. |
| 6,116,884 A | 9/2000 | Rowley et al. |
| 6,123,232 A | 9/2000 | Donselman et al. |
| 6,131,600 A | 10/2000 | Chang |
| 6,138,296 A | 10/2000 | Baker |
| 6,155,297 A | 12/2000 | MacAusland et al. |
| 6,161,230 A | 12/2000 | Pitsch |
| 6,170,098 B1 | 1/2001 | Pitsch |
| 6,177,516 B1 | 1/2001 | Hudak |
| 6,202,686 B1 | 3/2001 | Pitsch et al. |
| 6,227,464 B1 | 5/2001 | Allmendinger et al. |
| 6,238,575 B1 | 5/2001 | Patil |
| 6,256,810 B1 | 7/2001 | Baker |
| 6,270,125 B1 | 8/2001 | Rowley et al. |
| 6,286,808 B1 | 9/2001 | Slothower et al. |
| 6,287,501 B1 | 9/2001 | Rowley |
| 6,293,336 B1 | 9/2001 | Emerick, Sr. et al. |
| 6,296,017 B2 | 10/2001 | Kimizuka |
| 6,305,407 B1 | 10/2001 | Selby |
| 6,315,715 B1 | 11/2001 | Taylor et al. |
| 6,328,059 B1 | 12/2001 | Testori et al. |
| 6,334,466 B1 | 1/2002 | Jani et al. |
| 6,341,617 B1 | 1/2002 | Wilson |
| 6,349,733 B1 | 2/2002 | Smith |
| 6,378,790 B1 | 4/2002 | Paterson et al. |
| 6,381,776 B1 | 5/2002 | Wang |
| 6,385,794 B1 | 5/2002 | Miedzius et al. |
| 6,439,581 B1 | 8/2002 | Chang |
| 6,462,167 B1 | 10/2002 | Nodera et al. |
| 6,464,266 B1 | 10/2002 | O'Neill et al. |
| 6,485,666 B1 | 11/2002 | Rowley |
| 6,517,006 B1 | 2/2003 | Knapp |
| 6,557,907 B2 | 5/2003 | Rowley |
| 6,609,732 B1 | 8/2003 | Souvatzidis et al. |
| 6,635,334 B1 | 10/2003 | Jackson et al. |
| 6,640,357 B1 | 11/2003 | Chang |
| 6,732,543 B2 | 5/2004 | Jenkins, Jr. et al. |
| 6,770,376 B2 | 8/2004 | Chen |
| 6,770,384 B2 | 8/2004 | Chen |
| 6,783,160 B2 | 8/2004 | Rowley |
| 6,803,133 B2 | 10/2004 | Chen |
| 6,817,379 B2 | 11/2004 | Perla |
| 6,835,777 B2 | 12/2004 | Botros |
| 6,838,041 B2 | 1/2005 | Rowley |
| 6,848,719 B2 | 2/2005 | Rowley |
| 6,860,523 B2 | 3/2005 | O'Neill et al. |
| 6,860,524 B1 | 3/2005 | Rowley |
| 6,877,172 B2 | 4/2005 | Malek et al. |
| 6,880,573 B2 | 4/2005 | Berkman et al. |
| 6,894,115 B2 | 5/2005 | Botros |
| 6,902,210 B1 | 6/2005 | Rowley |
| 6,920,899 B2 | 7/2005 | Haenlein et al. |
| 6,959,729 B2 | 11/2005 | Graber |
| 6,959,736 B2 | 11/2005 | Järvenkylä |
| 6,962,168 B2 | 11/2005 | McDaniel et al. |
| 6,978,791 B2 | 12/2005 | Perrin |
| 7,055,545 B2 | 6/2006 | Mascari et al. |
| 7,063,105 B1 | 6/2006 | Chen |
| 7,111,640 B2 | 9/2006 | Rhodes |
| 7,118,138 B1 | 10/2006 | Rowley et al. |
| 7,124,776 B1 | 10/2006 | Hwang |
| 7,134,452 B2 | 11/2006 | Hiroshi et al. |
| 7,140,390 B2 | 11/2006 | Berkman et al. |
| 7,225,828 B2 | 6/2007 | Giagni et al. |
| 7,231,936 B2 | 6/2007 | Chang |
| 7,406,980 B2 | 8/2008 | Pinette |
| 7,490,619 B2 | 2/2009 | Farag et al. |
| 7,766,043 B2 | 8/2010 | Thomas et al. |
| 7,793,677 B2 | 9/2010 | Pinette |
| 7,828,013 B2 | 11/2010 | Lin |
| 8,240,326 B2 | 8/2012 | Kacik et al. |
| 8,684,025 B2 * | 4/2014 | Dai ................... 137/315.12 |
| 2002/0100139 A1 | 8/2002 | Rowley |
| 2002/0100510 A1 | 8/2002 | Otelli |
| 2002/0167171 A1 | 11/2002 | Becker et al. |
| 2003/0183286 A1 | 10/2003 | Yang |
| 2004/0007278 A1 | 1/2004 | Williams |
| 2004/0021120 A1 | 2/2004 | Turnau, III et al. |
| 2004/0060608 A1 | 4/2004 | Angus |
| 2004/0117906 A1 | 6/2004 | Baker et al. |
| 2004/0150132 A1 | 8/2004 | Rowley |
| 2004/0176503 A1 | 9/2004 | Czayka et al. |
| 2005/0005989 A1 | 1/2005 | Roloff |
| 2005/0194051 A1 | 9/2005 | Pinette |
| 2006/0108705 A1 | 5/2006 | Rowley |
| 2006/0118185 A1 | 6/2006 | Nobili |
| 2006/0124183 A1 | 6/2006 | Kuo |
| 2006/0130908 A1 | 6/2006 | Marty et al. |
| 2006/0170134 A1 | 8/2006 | Rowley et al. |
| 2006/0174955 A1 | 8/2006 | Huang |
| 2006/0191580 A1 | 8/2006 | Sponheimer et al. |
| 2006/0200904 A1 | 9/2006 | Vogel et al. |
| 2006/0202142 A1 | 9/2006 | Marty et al. |
| 2007/0044232 A1 | 3/2007 | McNerney et al. |
| 2007/0044852 A1 | 3/2007 | Pinette |
| 2007/0137714 A1 | 6/2007 | Meehan et al. |
| 2007/0137718 A1 | 6/2007 | Rushlander et al. |
| 2007/0271695 A1 | 11/2007 | Thomas et al. |
| 2009/0078322 A1 | 3/2009 | Thomas et al. |
| 2011/0079307 A1 | 4/2011 | Marty et al. |
| 2011/0094604 A1 | 4/2011 | Thomas et al. |
| 2011/0259456 A1 | 10/2011 | Pinette et al. |
| 2012/0227843 A1 | 9/2012 | Thomas et al. |

FOREIGN PATENT DOCUMENTS

| | | |
|---|---|---|
| CN | 201301977 Y | 9/2009 |
| CN | 102076599 A | 5/2011 |
| CN | 102226478 A | 10/2011 |
| DE | 10133041 | 1/2003 |
| EP | 0 632 220 | 1/1995 |
| EP | 0 808 952 | 11/1997 |
| EP | 1 072 830 | 9/2004 |
| JP | 3094877 | 4/1991 |
| JP | 200132343 | 6/2001 |
| WO | WO 91/05191 | 4/1991 |
| WO | WO 00/61831 | 10/2000 |
| WO | WO 02/25022 | 3/2002 |
| WO | WO 2005/108829 | 11/2005 |
| WO | WO 2006/099273 | 9/2006 |
| WO | WO 2009/126887 | 10/2009 |
| WO | WO 2009/155529 | 12/2009 |
| WO | WO 2009/158497 | 12/2009 |
| WO | WO 2009/158498 | 12/2009 |

OTHER PUBLICATIONS

Dadex Polydex, 2005, 1 pg.
Dow, Plastic Pipes Europe, Middle East & Africa, Hot and Cold Water Pipes, 2007, 1 pg.
Dow, Plastic Pipes Europe, Middle East, & Africa, Dowlex PE-RT, 2007, 2 pgs.
Kerox, Ceramic Mixing Cartridge, Conventional Single-Lever Type, Model K-28, 2005, 2 pgs.
Kerox, Standard Cartridges, 2005, 3 pgs.
Noveon, Inc.; Processing with TempRite® PEX Ensures Quality Piping, www.tempritepex.com/processingInstallation/processing.asp, at least as early as Jun. 7, 2005, 2 pgs.
PEX Association, What is PE-X?, at least as early as Jan. 31, 2007, 7 pgs.
PPI Plastics Pipe Institute, Crosslinked Polyethylene (PEX) Tubing, TN-17/2001, www.plasticpipe.org/pdf/pubs/notes/tn17-01.pdf, Jun. 2001, 7 pgs.
SpecialChem S.A., Silane Crosslinking Agents Center, Crosslinking Mechanism, www.specialchem4polymers.com/tc/silane-crosslinking-agents/index.aspx?id=mechanism, at least as early as Jun. 7, 2005, 2 pgs.
Ticona Engineering Polymers, Engineering Polymers for Innovative Applications catalog, Mar. 2006, 16 pgs.

* cited by examiner

TWO HANDLE CENTERSET FAUCET

BACKGROUND AND SUMMARY OF THE INVENTION

The present invention relates to a faucet assembly and, more particularly, to a faucet assembly platform for supporting a non-metallic waterway.

Faucets are typically controlled by either a single handle which utilizes a mixing valve to proportion the flow of hot and cold water to a faucet spout, or two handles which utilize individual valves to separately control the flow of hot water and cold water to the faucet spout. In the case of the standard prior art mixing valve, two inlets are provided, one each for hot and cold water supplies. For two handle faucets, each valve typically includes only one inlet opening which fluidly communicates with the flow passageway of a valving member. One type of two handle faucet is a centerset faucet where hot and cold water valves are coupled with the spout to a sink deck through a common base.

Two handle centerset faucets, particularly those having a separate spout mounted on an escutcheon, have generally been of a simple construction. Inlet connections, valve bodies, connection tubes, and spout couplings have been typically cast as a single component, commonly formed of brass. This construction has proven robust and easy to manufacture, but is relatively expensive and provides direct water contact with metal.

Alternative construction methods may use polymer waterways as a way of reducing cost and eliminating water contact with metal. However, such polymer waterways may be perceived as being less robust than those formed of metal, particularly in connection with valve interfaces for resisting torque generated by installation and removal of valves, including bonnet nuts. The present invention relates to a hybrid metallic/polymer centerset faucet assembly to take advantage of the material properties of both metals and plastics.

According to an illustrative embodiment of the present disclosure, a centerset faucet includes an upper support formed of a polymer, the upper support including a first valve receiving cavity, a second valve receiving cavity, an outlet cavity, a first channel connecting the first valve receiving cavity and the outlet cavity, and a second channel connecting the second valve receiving cavity and the outlet cavity. A waterway includes a first valve interface, a second valve interface, an outlet, a first connector coupling the first valve interface with the outlet, and a second connector coupling the second valve interface with the outlet. The first valve interface is received within the first valve receiving cavity of the upper support, the second valve interface is received within the second valve receiving cavity of the upper support, the outlet is received within the outlet cavity of the upper support, the first connector is received within the first channel of the upper support, and the second connector is received within the second channel of the upper support. The centerset faucet further includes a hot water shank including a retaining portion and a downwardly extending connection portion, and a cold water shank including a retaining portion and a downwardly extending connection portion. A metallic lower base is coupled to the upper support, wherein the retaining portion of the hot water shank, the retaining portion of the cold water shank, the first valve interface, and the second valve interface are secured intermediate the lower base and the upper support.

According to another illustrative embodiment of the present disclosure, a centerset faucet includes an upper support formed of a polymer and having a bottom lip. A waterway includes a cold water supply tube, a hot water supply tube, an outlet, a cold water connector fluidly coupling the cold water supply tube with the outlet and received within the upper support, and a hot water connector fluidly coupling the hot water supply tube with the outlet and received within the upper support. A lower base is formed of a metal and is coupled to the upper support. The lower base includes a lower wall positioned below the bottom lip of the upper support, and a reentrant edge formed over the bottom lip of the upper support to secure the lower base to the upper support.

According to a further illustrative embodiment of the present disclosure, a method of forming a centerset faucet includes the steps of providing an upper support formed of a polymer, coupling first and second inserts within first and second valve receiving cavities of the upper support, and inserting a waterway from below the upper support, the waterway including first and second valve interfaces received within the first and second inserts. The method further includes the steps of placing first and second shanks below the waterway, and securing a lower base to the upper support by forming an edge of the lower base around a bottom lip of the upper support, wherein retaining portions of the shanks are captured between the lower base and the upper support.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
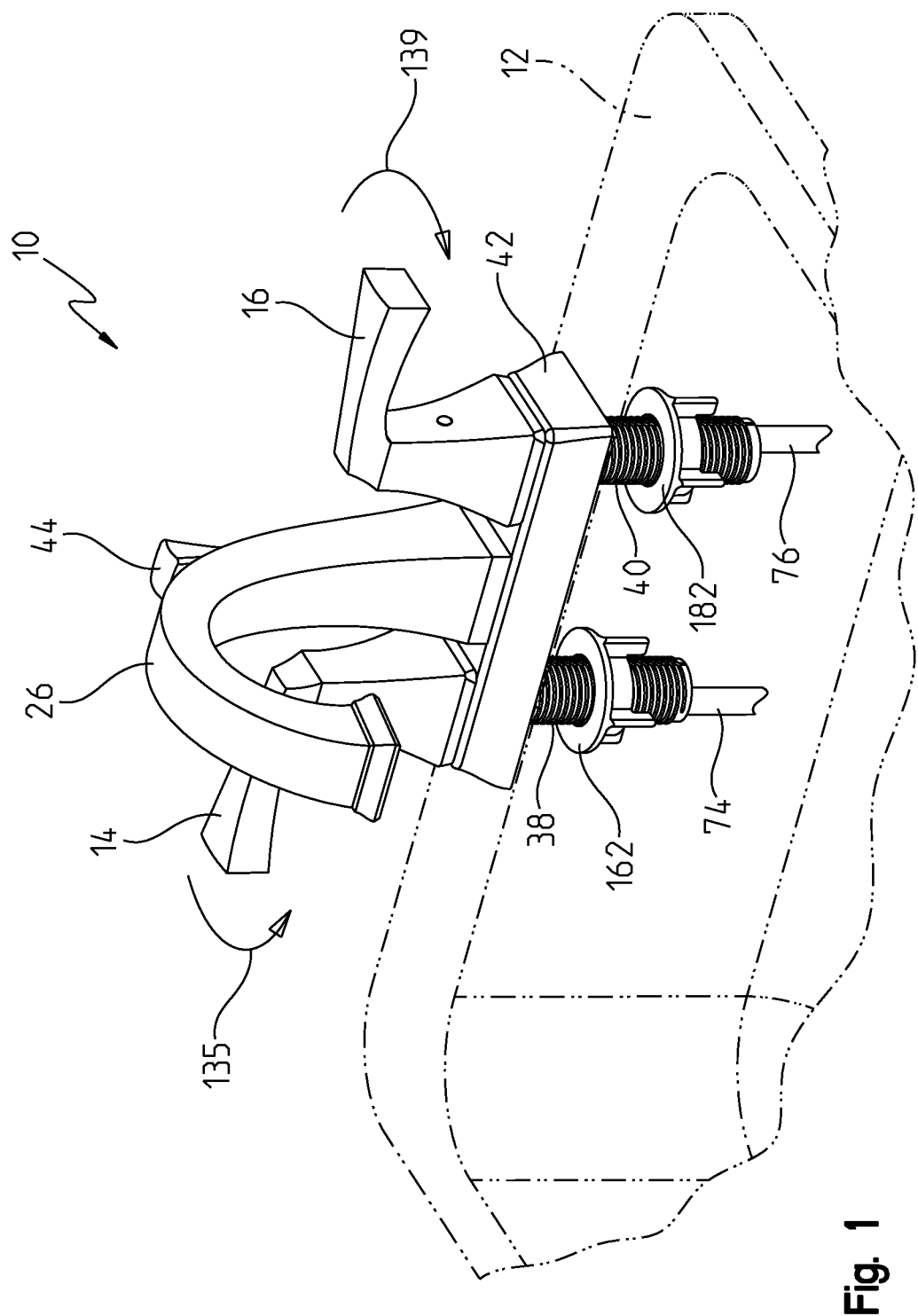
FIG. 1 is a perspective view of an illustrative faucet assembly mounted to a sink deck.
Figure 2:
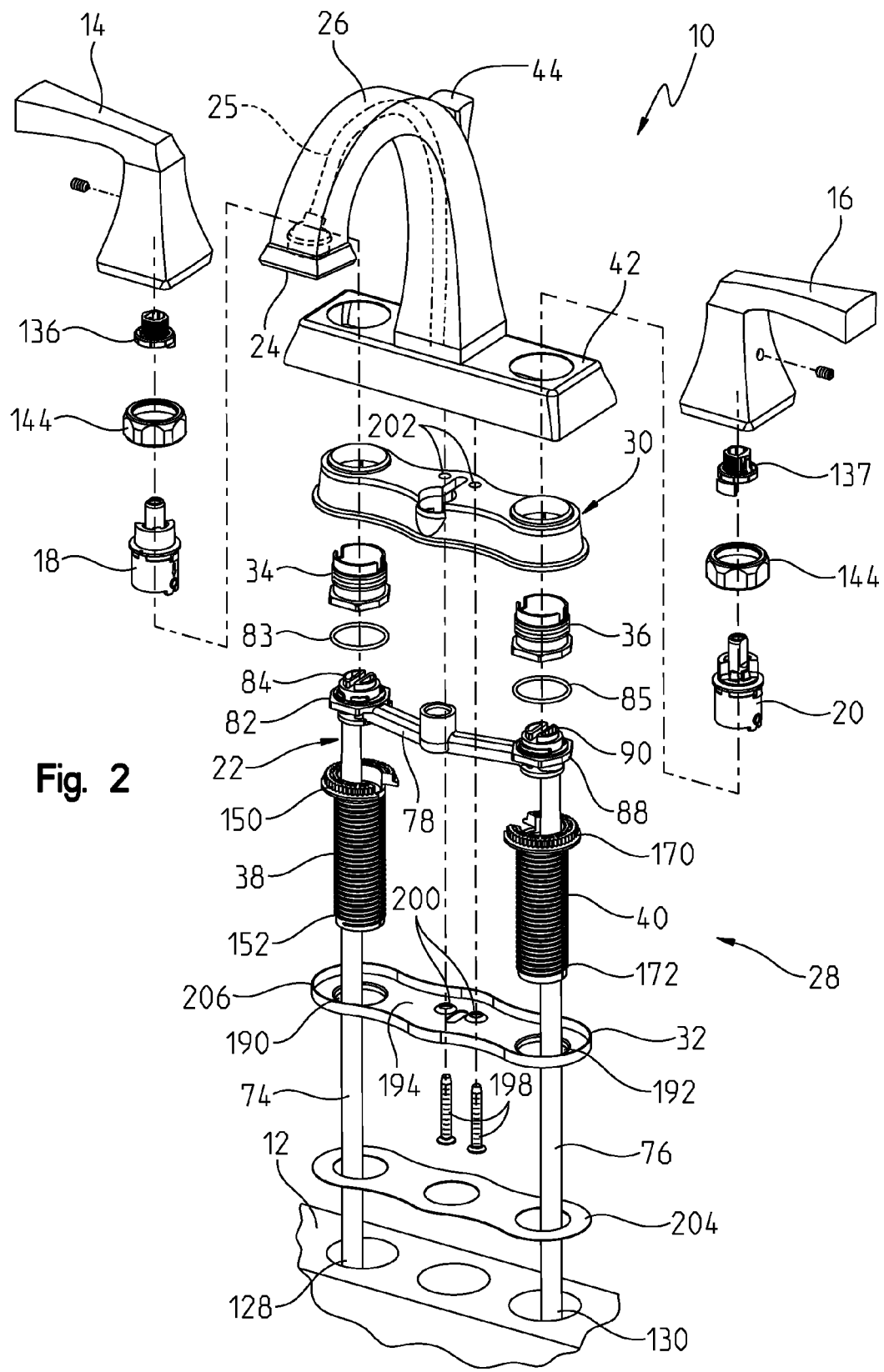
FIG. 2 is a top exploded perspective view of the faucet assembly of FIG. 1.
Figure 3:
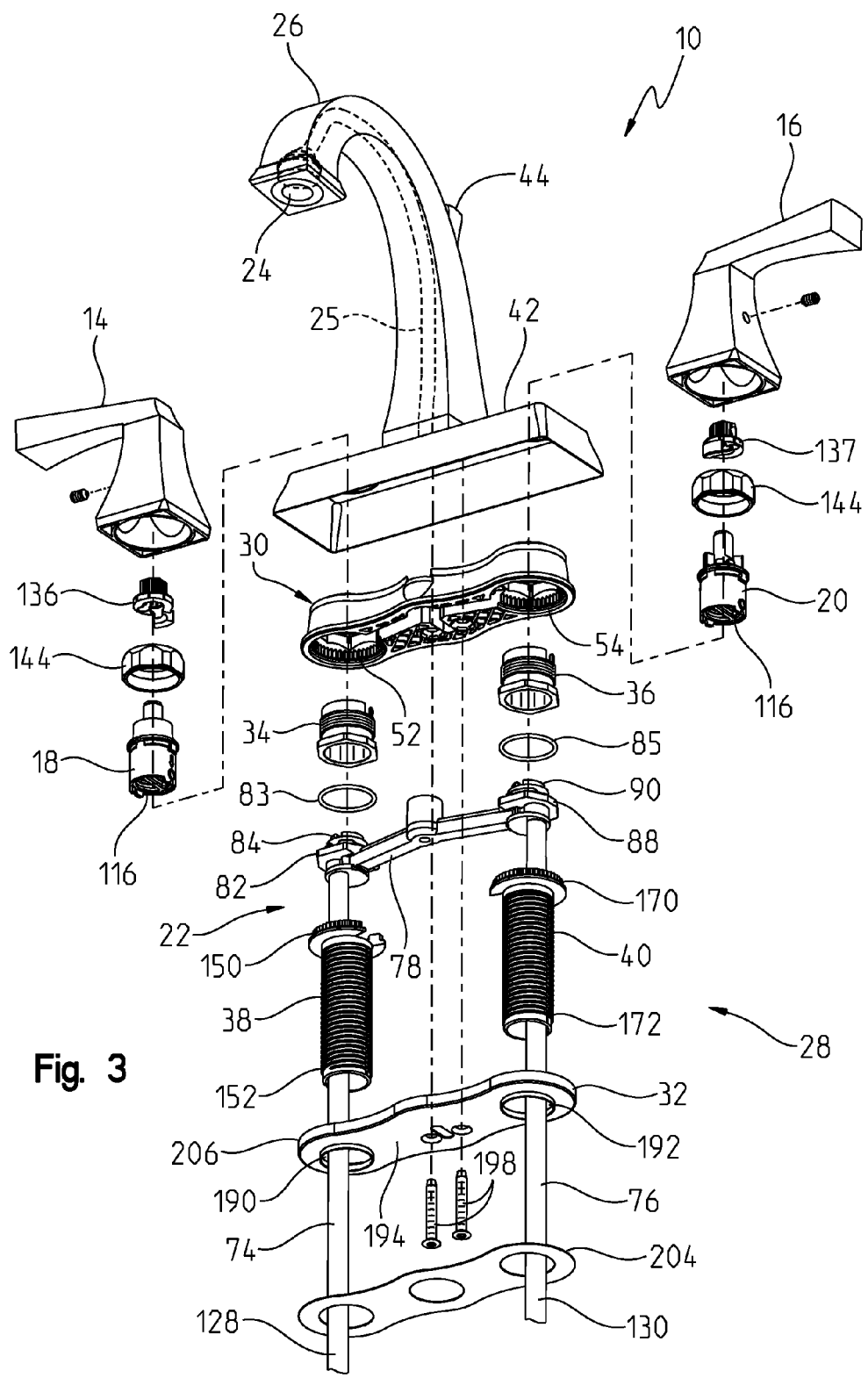
FIG. 3 is a bottom exploded perspective view of the faucet assembly of FIG. 1.

Referring initially to FIG. 1, an illustrative embodiment faucet assembly 10 is shown coupled to a mounting deck, illustratively a sink deck 12. As shown in FIGS. 2 and 3, the faucet assembly 10 includes hot and cold water handles 14 and 16 operably coupled to hot and cold water control valve cartridges 18 and 20, respectively. A waterway 22 fluidly couples the valve cartridges 18 and 20 upstream to hot and cold water supplies, illustratively valves or stops (not shown), and downstream to a mixed water outlet 24. The mixed water outlet 24 is illustratively defined by an outlet tube 25 supported by a delivery spout 26 formed of a metal, such as a plated brass. In the illustrative embodiment, the valve cartridges 18 and 20 and cooperating handles 14 and 16, along with the fluid delivery spout 24 are operably coupled to a common support assembly 28 positioned above the sink deck 12, thereby defining what is often referred to as a centerset faucet. As is known, rotation of the handles 14 and 16 operates the valve cartridges 18 and 20 to control the flow of hot and cold water, respectively, delivered to the outlet 24.

Figure 4:
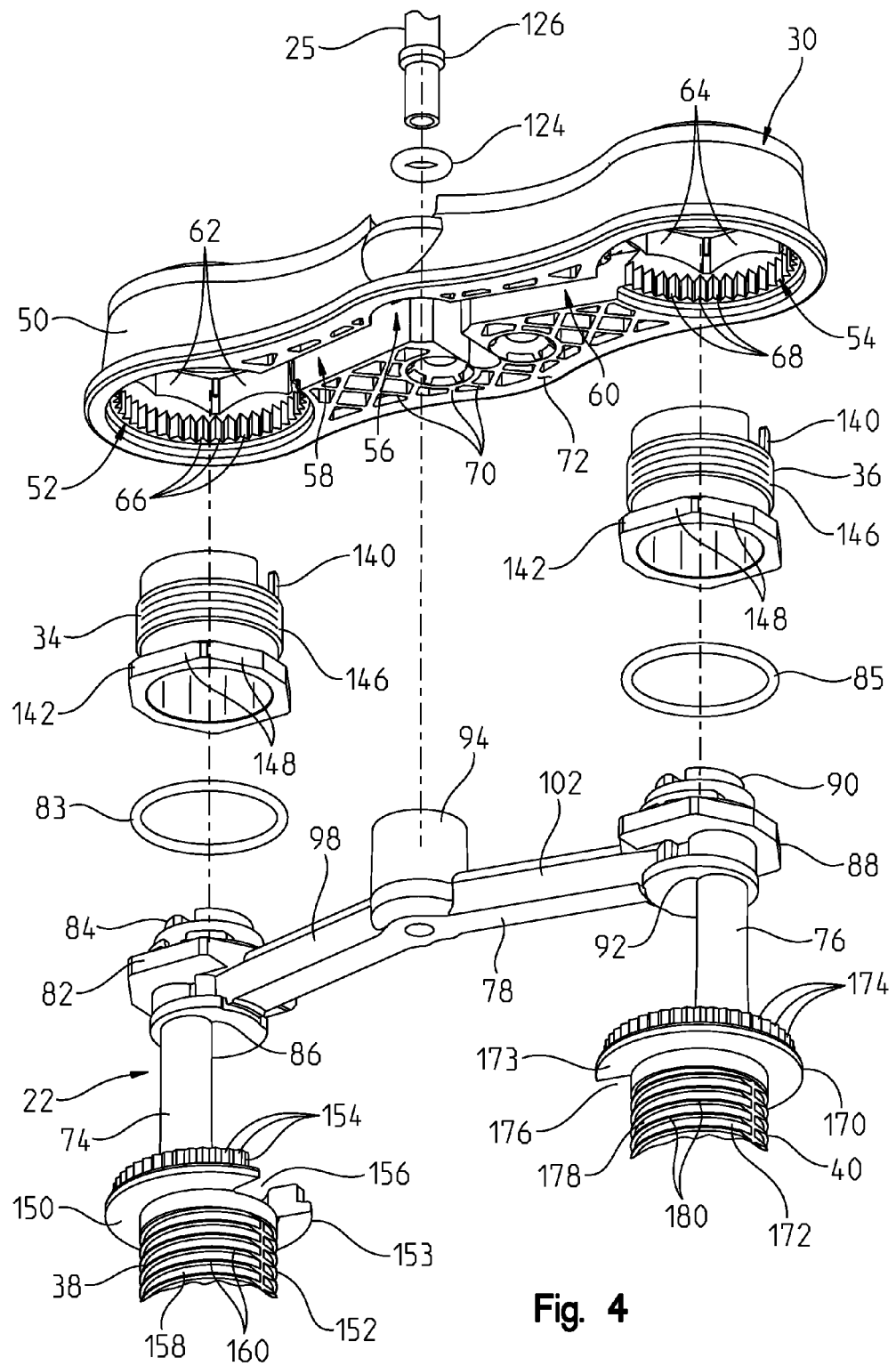
FIG. 4 is a detailed exploded perspective view of the faucet assembly of FIG. 3.
Figure 5:
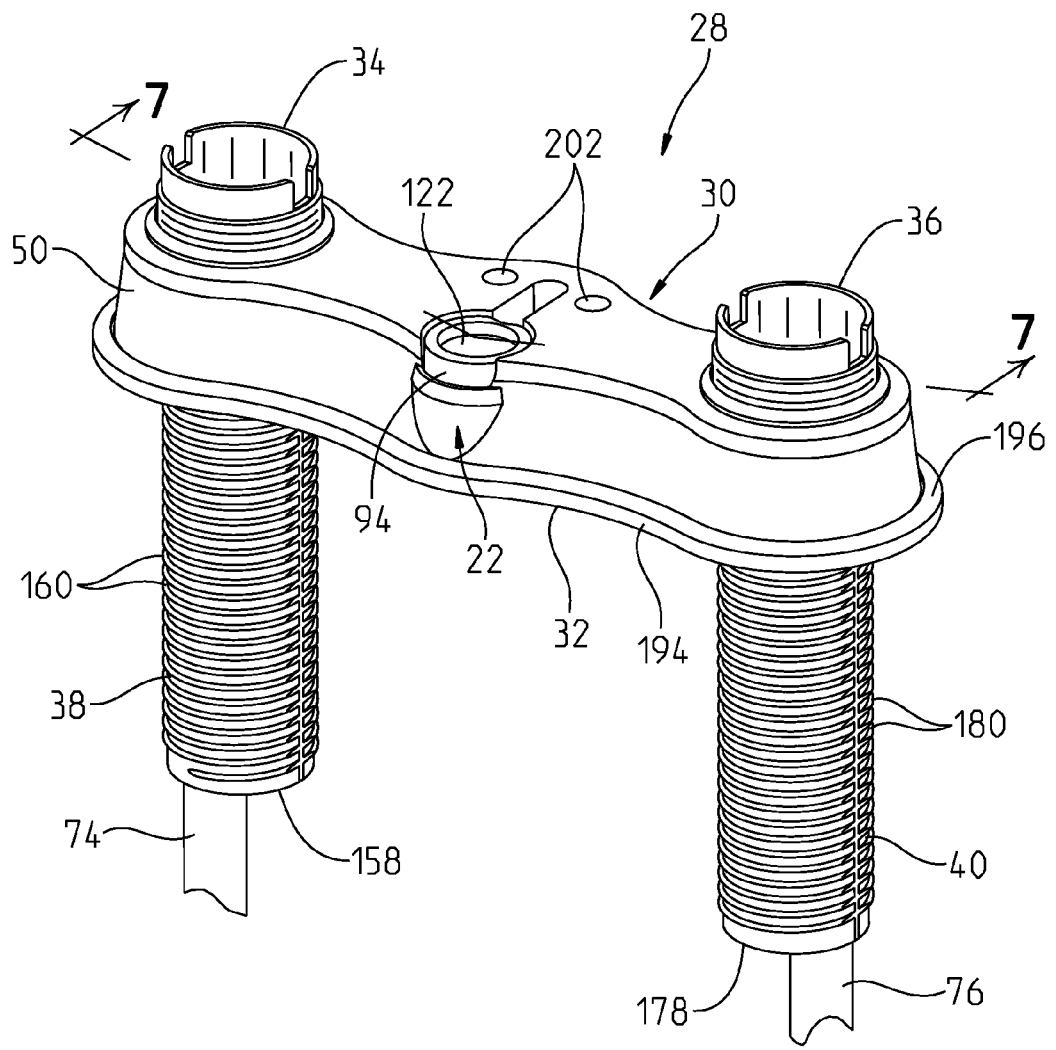
FIG. 5 is a top perspective view of the common support assembly of FIG. 2.
Figure 6:
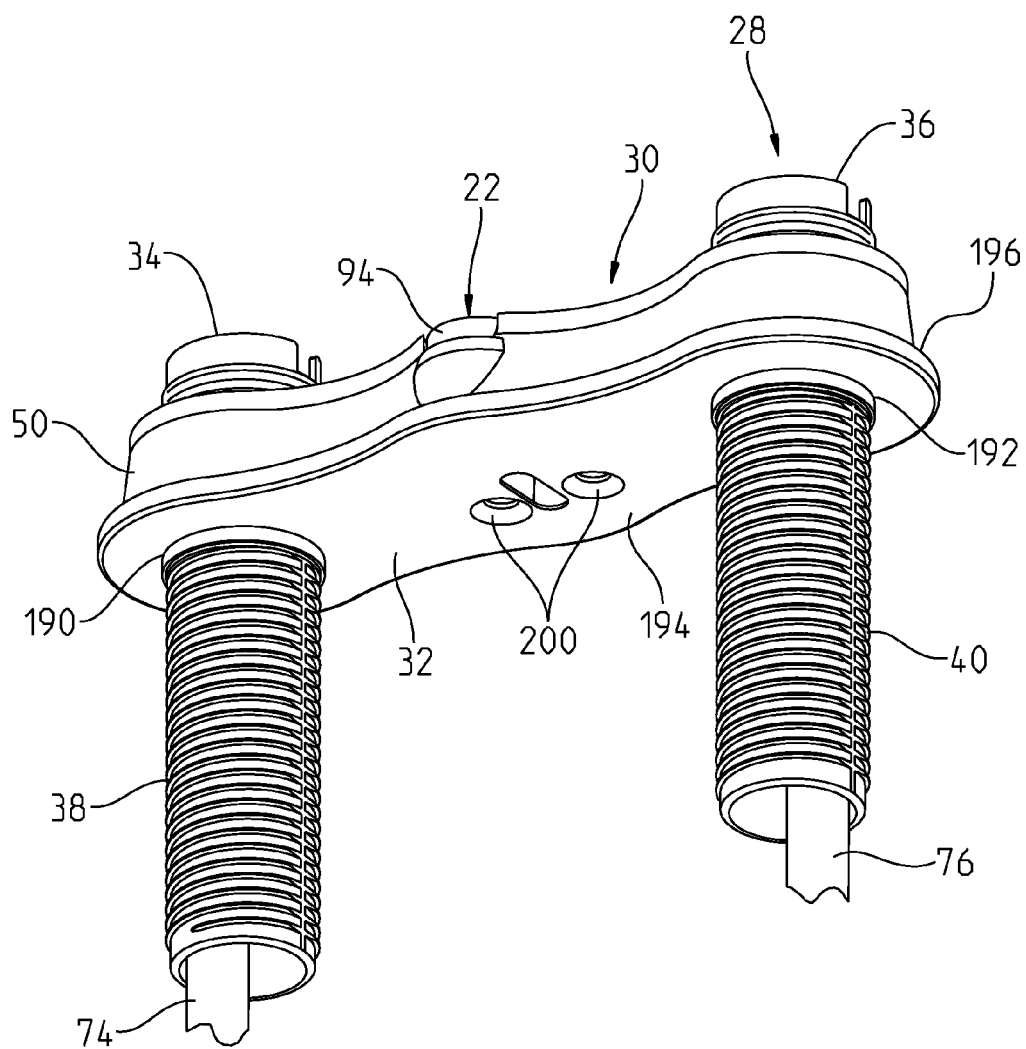
FIG. 6 is a bottom perspective view of the common support assembly of FIG. 5.

With reference to FIGS. 4-6, the common support assembly 28 of the centerset faucet assembly 10 includes an upper support 30 coupled to a lower base 32. The waterway 22 is positioned intermediate the upper support 30 and the lower base 32. A first or hot water insert 34 and a second or cold water insert 36 are illustratively coupled intermediate the waterway 22 and the upper support 30. A first or hot water shank 38 and a second or cold water shank 40 are coupled intermediate the waterway 22 and the lower base 32.

The delivery spout 26 is illustratively coupled to an escutcheon 42. Both the delivery spout 26 and the escutcheon 42 may be integrally formed of a zinc alloy. A lift rod 44 is illustratively supported by the delivery spout 26 and may be formed of a zinc alloy. Illustratively, the lift rod 44 is operably coupled to a pop-up drain assembly (not shown) below the sink deck 12 in a conventional manner.

With reference to FIGS. 4 and 5, the upper support 30 includes a body 50 defining a first valve receiving cavity 52 and a second valve receiving cavity 54 laterally spaced from the first valve receiving cavity 52. An outlet cavity 56 is positioned laterally intermediate the first valve receiving cavity 52 and the second valve receiving cavity 54. A first channel 58 connects the first valve receiving cavity 52 and the outlet cavity 56. Similarly, a second channel 60 connects the second valve receiving cavity 54 and the outlet cavity 56. The upper support 30 is illustratively molded from a polymer, such as acetal.

Each valve receiving cavity 52 and 54 illustratively includes a plurality of flats 62 and 64 formed in an upper portion thereof, and a plurality of radially extending teeth 66 and 68 formed in a lower portion thereof. As further detailed herein, the flats 62 and 64 cooperate with respective inserts 34 and 36, while the teeth 66 and 68 cooperate with respective shanks 38 and 40. The upper support 30 also illustratively includes a plurality of intersecting ribs 70 formed in a lower surface 72 to improve stiffness and resist loading on the spout 26. A bottom lip 73 extends around a periphery of the body 50 proximate a lower surface of the upper support 30. As further detailed herein, the bottom lip 73 cooperates with the lower base 32 to couple together the inserts 34, 36, the waterway 22, and the shanks 38, 40.

In the illustrative embodiment, the waterway 22 is coupled to the upper support 30 and includes downwardly extending hot and cold water inlet conduits or tubes 74 and 76 extending downwardly through the shanks 38 and 40, respectively. Hot and cold water inlet tubes 74 and 76 may be fluidly coupled to hot and cold water stops (not shown). The illustrative waterway 22 further includes a coupler or connecting portion 78 coupling the inlet tubes 74 and 76 with the outlet tube 25.

With reference now to FIGS. 2-4, the coupler 78 of the waterway 22 illustratively includes a first valve support 82 having a first valve interface 84 and overmolded about a proximal end 86 of the hot water inlet tube 74. The coupler 78 of the waterway 22 further includes a second valve support 88 having a second valve interface 90 and overmolded about the proximal end 92 of the cold water inlet tube 76. O-rings 83 and 85 are illustratively positioned intermediate the inserts 34, 36 and the valve supports 82, 88, respectively, to provide sealing therebetween.

An outlet tube interface 94 is illustratively defined by the coupler 78 and positioned intermediate the first valve support 82 and the second valve support 88. The interface 94 is configured to be in fluid communication with the outlet tube 25 defining the mixed water outlet 24. As shown in FIG. 4, the outlet tube interface 94 illustratively includes a counterbore 122 for receiving an o-ring 124 to provide a seal intermediate a female coupler ring or collar 126 of the outlet tube 25 and the interface 94.

Figure 7:
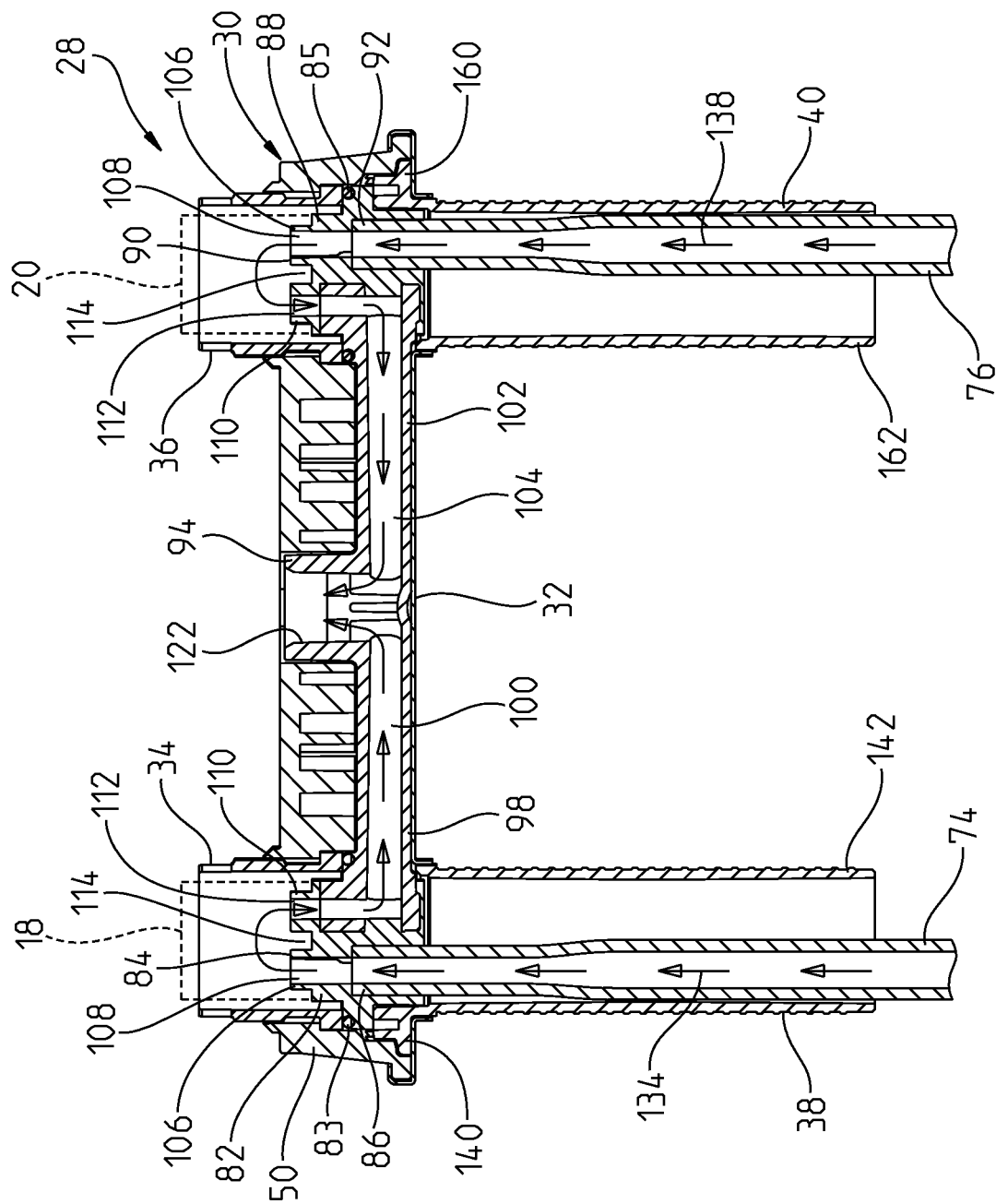
FIG. 7 is a cross-sectional view taken along line 7-7 of FIG. 5.

With reference to FIGS. 4 and 7, a first or hot water fluid connector 98 formed by the coupler 78 defines an internal waterway 100 fluidly coupling the first valve support 82 and the outlet tube interface 94. A second or cold water fluid connector 102 formed by the coupler 78 defines a second internal waterway 104 and fluidly couples the second valve support 88 and the outlet tube interface 94. While the outlet tube interface 94 shown in FIG. 2 is positioned forward of the first and second valve supports 82 and 88, in other illustrative embodiments, the outlet tube interface 94 may be substantially aligned with, or positioned rearward of, the first and second valve supports 82 and 88.

The valve interfaces 84 and 90 of the first and second valve supports 82 and 88 each include an upwardly projecting inlet wall 106 extending around an inlet port 108, and an upwardly projecting outlet wall 110 extending around an outlet port 112. The inlet and outlet walls 106 and 110 define a trench 114 for receiving a resilient gasket 116 (FIG. 3). The gasket 116 may be formed of an elastomer and provides a seal intermediate the respective valve cartridges 18 and 20 and valve supports 82 and 88, respectively.

As further detailed herein, the coupler 78 is illustratively formed of a flowable material which is overmolded around proximal ends 86 and 92 of inlet tubes 74 and 86, respectively, while defining the connectors 98 and 102 and outlet interface 94. In other illustrative embodiments, separate hot water and cold water couplers may be overmolded around inlet tubes 74, 86 and preformed connectors 98, 102, respectively, to define the waterway 22. While any suitable material may be used to form coupler 78, a polymer, including thermoplastics and thermosets, may be utilized in the illustrative embodiment. In one illustrative embodiment, the coupler 78 is formed of polyethylene which has been overmolded around the proximal ends of the inlet tubes 74 and 76 and subsequently cross-linked to form PEX. It should be noted that in certain illustrative embodiments, reinforcing members, such as glass fibers, may be provided within the polyethylene of the connectors.

Both waterway inlet tubes 74 and 76 are illustratively flexible such that connecting distal ends 128 and 130 may be moved relative to the opposing proximal ends 86 and 92 coupled to the respective couplers 78 and 80. End fittings (not shown) may be coupled to distal ends 128 and 130, respectively, to facilitate coupling to conventional hot and cold water stops (not shown). In one illustrative embodiment, the end fittings may be of the type detailed in U.S. patent application Ser. No. 12/233,839, filed Sep. 19, 2008, entitled "Overmolded Fitting Connection with Color Indication."

Additional details of an illustrative waterway are disclosed in U.S. patent application Ser. No. 12/935,506, filed Sep. 29, 2010, entitled "Molded Waterway for a Two Handle Faucet," the disclosure of which is expressly incorporated by reference herein.

Operation of the valve cartridge 18 controls the flow rate of hot water from the hot water inlet tube 74 to the outlet tube 25. In one illustrative embodiment, the hot water inlet tube 74 and the hot water connector 98 are formed of a polymer, such as a polyethylene, and the valve support 82 is an overmold formed of a polymer, such as a polyethylene, molded around adjacent ends of the tube 74 and connector 98. The polyethylene of the valve support 82, the tube 74, and the connector 98 may be subsequently cross-linked to form cross-linked polyethylene (PEX). In another illustrative embodiment, the hot water connector 98 is simultaneously molded as part of the coupler 78.

Operation of the valve cartridge 20 controls the flow rate of cold water from the cold water inlet tube 76 to the outlet tube 25. Illustratively, the cold water inlet tube 76 and the cold water connector 102 are formed of a polymer, such as a polyethylene, and the valve support 88 is an overmold formed of a polymer, such as a polyethylene, molded around adjacent ends of the tube 76 and connector 102. The polyethylene of the valve support 88, the tube 76, and the connector 102 may be subsequently cross-linked to form cross-linked polyethylene (PEX). In another illustrative embodiment, the cold water connector 102 is simultaneously molded as part of the coupler 80.

The hot water valve cartridge 18 illustratively includes a valve member (not shown) that is movable between a first position wherein water from the hot water inlet tube 74 is in fluid communication with the internal waterway 100 of hot water connector 98, and a second position where water from the hot water inlet tube 74 is not in fluid communication with the internal waterway 100 of hot water connector 98. Arrows 134 in FIG. 7 represent hot water flow through the valve cartridge 18 from inlet tube 74 to hot water connector 98, and subsequently to outlet tube 25. In one illustrative embodiment, the valve member of hot water valve cartridge 18 is a rotatable disk wherein the rotational position of the disc is adjusted through a hot water user input, such as handle 14. Handle 14 generally extends above the escutcheon 42 of the faucet 10 and is rotatable in the direction of arrow 135 in FIG. 1. As shown in FIGS. 2 and 3, a limit stop 136 may be positioned intermediate the handle 14 and the valve cartridge 18 to limit rotational movement of the handle 14. It should be appreciated that the handle 14 may be replaced with other user inputs, such as a knob.

Similarly, cold water valve cartridge 20 illustratively includes a valve member (not shown) that is movable between a first position where water from the cold water inlet tube 76 is in fluid communication with internal waterway 104 of cold water connector 102, and a second position where water from the cold water inlet tube 76 is not in fluid communication with internal waterway 104 of cold water connector 102. Arrows 138 in FIG. 7 represents cold water flow through valve cartridge 20 from inlet tube 76 to cold water connector 102, and subsequently to outlet tube 25. In one illustrative embodiment, the valve member of cold water valve cartridge 20 is a rotatable disc that may be rotatably adjusted through a cold water user input, such as handle 16. Handle 16 generally extends above escutcheon 42 of the faucet 10 and is rotatable in the direction of arrow 139 in FIG. 1. As shown in FIGS. 2 and 3, a limit stop 137 may be positioned intermediate the handle 16 and the valve cartridge 20 to limit rotational movement of the handle 16. As with handle 14, handle 16 may be replaced with other user inputs, such as a knob.

In one illustrative embodiment, the valve cartridges 18 and 20 may be of the type disclosed in U.S. patent application Ser. No. 12/994,968, filed Nov. 29, 2010, entitled "Valve Assembly for a Two Handle Faucet." Additional exemplary rotatable valves are disclosed in U.S. Pat. Nos. 3,645,493; 4,453,567; 4,577,835; and 4,700,928.

As noted above, the inserts 34 and 36 are illustratively received within the valve receiving cavities 52 and 54 of the upper support 30. In one illustrative embodiment, the inserts 34 and 36 may be initially held in place during assembly through a friction fit with the upper support 30. Illustratively, the inserts 34 and 36 are formed of metal, such as brass, although other materials of suitable strength and durability may be substituted therefor. Each insert 34, 36 illustratively includes a cylindrical sidewall 140 extending upwardly from a base 142. Each valve cartridge 18, 20 is received within respective insert 34, 36 and retained therein through a bonnet nut 144 (FIG. 2) threadably engaging external threads 146 of the sidewall 140. Flats 148 of the base 142 cooperate with flats 62 within the upper support 30 to help orient and retain the inserts 34, 36.

Referring to FIGS. 2-4, the hot water shank 38 includes an upper retaining portion 150 and a downwardly extending connection portion 152. The retaining portion 150 illustratively includes an arcuate flange 153 supporting a plurality of radially extending teeth 154. The teeth 154 cooperate with teeth 66 in the upper support 30 to resist relative rotation between the shank 38 and the upper support 30. A gap or recess 156 is formed within the flange 152 to receive the hot water connector 98 of the waterway 22. The downwardly extending connection portion 152 illustratively includes a cylindrical tube 158 supporting a plurality of external threads 160. The hot water inlet tube 74 extends downwardly through the tube 158 while a mounting nut 162 is threadably received on the hot water shank 38 to secure the support assembly 28 to the sink deck 12 (FIG. 1). The hot water shank 38 may be formed of a metal, such as being die cast from zinc. In alternative embodiments, the hot water shank 38 may be formed of a polymer.

Similarly, the cold water shank 40 includes an upper retaining portion 170 and a downwardly extending connection portion 172. The retaining portion 170 illustratively includes an arcuate flange 173 supporting a plurality of radially extending teeth 174. The teeth 174 cooperate with teeth 68 in the upper support 30 to resist relative rotation between the shank 38 and the upper support 30. A recess 176 is formed within the flange 172 to receive the cold water connector 102 of the waterway 22. The downwardly extending connection portion 172 illustratively includes a cylindrical tube 178 supporting a plurality of external threads 180. The cold water inlet tube 76 extends downwardly through the tube 178, while a mounting nut 182 is threadably received on the cold water shank 40 to secure the support assembly 28 to the sink deck 12. The cold water shank 40 may be formed of a metal, such as being die cast from zinc. In alternative embodiments, the cold water shank 40 may be formed of a polymer.

The lower base 32 is illustratively formed of a metal, such as stainless steel. More particularly, the lower base 32 may be stamped from a thin stainless steel sheet. The lower base 32 illustratively is formed from a 0.022 inch thick stainless steel sheet. The retaining portion 150 of the hot water shank 38, and the retaining portion 170 of the cold water shank 40, the first valve interface 84, and the second valve interface 90 are all secured intermediate the lower base 32 and the upper support 30. More particularly, the connection portions 152, 172 of the hot water and cold water shanks 38, 40 extend downwardly through openings 190 and 192 in a lower wall 194 of the base 32. The lower wall 194 of the base 32 is positioned below a bottom lip 73 of the upper support 30.

Figure 9:
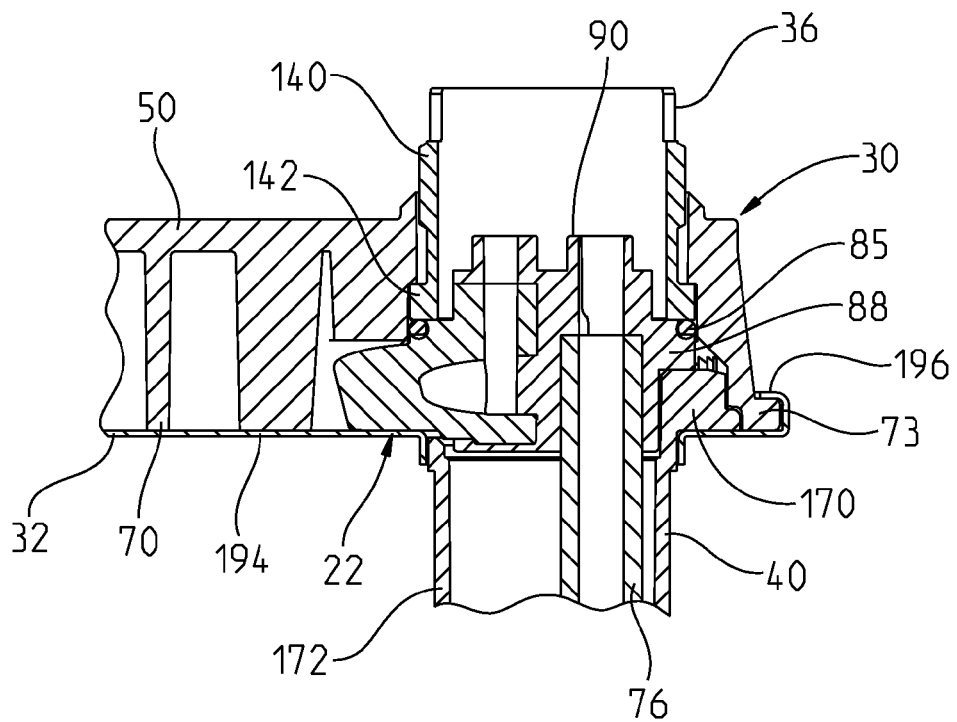
FIG. 9 is a partial cross-sectional view taken similar to FIG. 8, showing the edge of the lower base formed over the bottom lip of the upper support.

With reference to FIG. 9, a reentrant edge 196 is formed over the bottom lip 73 of the upper support 30 to secure the base 32 to the upper support 30. The reentrant edge 196 illustratively extends continuously around the periphery of the lower base 32 and upper support 30.

As noted above, delivery spout 26 is supported above the escutcheon 42 and receives the outlet tube 25. A pair of fasteners 198, such as screws, extend upwardly through openings 200 in the base 32, openings 202 in the upper support 30, and into the spout 26 to secure the spout 26 to the common support assembly 28. A gasket 204, illustratively formed of a closed cell foam, may be positioned below the base 32 to provide a seal intermediate the base 32 and the sink deck 12.

An illustrative method of forming the centerset faucet 10 includes injection molding the upper support 30 from a polymer, illustratively a thermoplastic such as acetal. Next, the first and second inserts 34 and 36 are inserted from below the upper support 30 into the first and second valve receiving cavities 52 and 54. The inserts 34 and 36 are press fit into position within the upper support 30 to ensure that they are retained during subsequent assembly steps. Flats 148 on the inserts 34 and 36 are aligned with flats 62 and 64 within the upper support 30 to provide a resistance to torque applied to the faucet handles 14, 16.

Next, the waterway 22 is inserted from below into the upper support 30. More particularly, the first and second valve interfaces 84 and 90 are received within the first and second valve receiving cavities 52 and 54 of the upper support 30. O-rings 83 and 85 are placed between the waterway 22 and the inserts 34 and 36 to prevent potential valve leaks from collecting below the faucet 10. Next, the shanks 38 and 40 are placed below the waterway 22 for supporting the waterway 22 against water pressure and the loading of valve seal compression.

Figure 8:
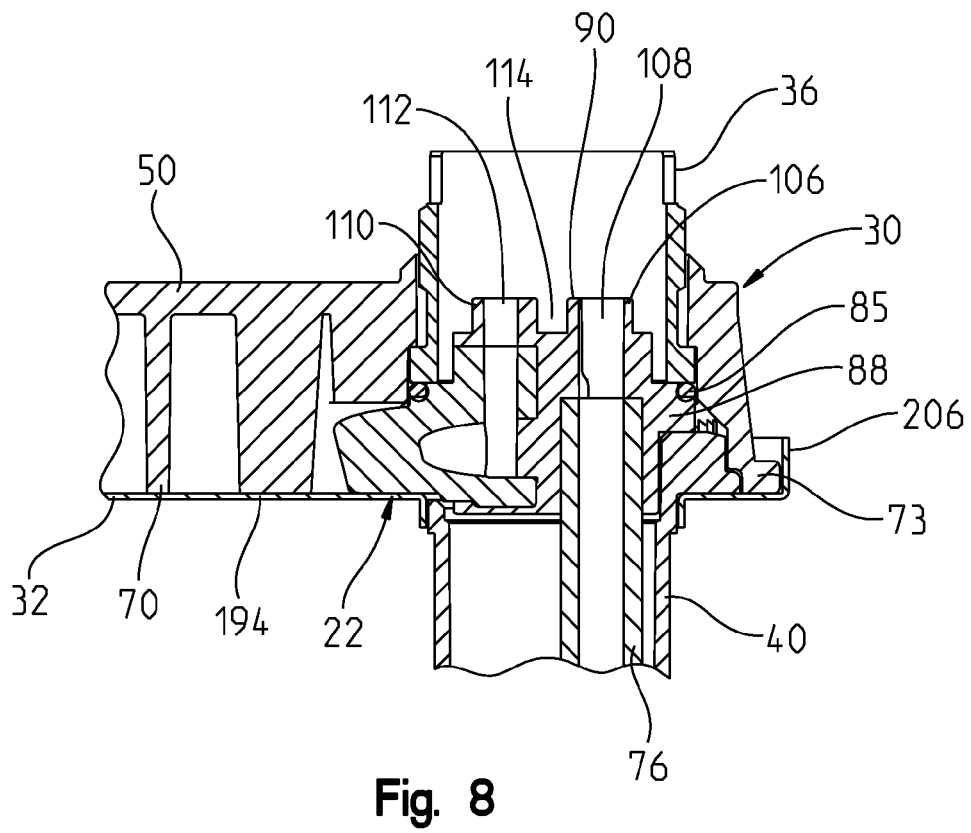
FIG. 8 is a partial cross-sectional view showing the lower base prior to its edge being formed over the bottom lip of the upper support.

Next, the lower base 32 is received over the shanks 38 and 40. As shown in FIGS. 2, 3, and 8, the lower base 32 is initially formed with an upwardly extending edge 206 formed around its perimeter. A press is illustratively used to form (e.g., roll) the edge 206 around the bottom lip 73 of the upper support 30, returning the edge 206 back in alignment with the lower base 32 and defining reentrant edge 196. In other words, reentrant edge 196 extends substantially parallel to the lower wall 192 of the base 32. As such, the base 32 retains the waterway 22 against water pressure. Further, it presses shanks 38 and 40 tightly against the inserts 34 and 36, thereby eliminating tolerance stack from between the upper support 30 and the lower base 32, and allowing the tolerances of common support assembly 28 to be relaxed. Finally, such an assembly 28 distributes a load from the spout 26 and the shanks 38, 40 more evenly around the upper support 30, allowing the use of a less stiff material for the upper support 30.

Although the invention has been described in detail with reference to certain preferred embodiments, variations and modifications exist within the spirit and scope of the invention as described and defined in the following claims.

The invention claimed is:

1. A centerset faucet comprising:
an upper support formed of a polymer, the upper support including a first valve receiving cavity, a second valve receiving cavity, an outlet cavity, a first channel connecting the first valve receiving cavity and the outlet cavity, and a second channel connecting the second valve receiving cavity and outlet cavity;
a waterway including a first valve interface, a second valve interface, an outlet, a first connector coupling the first valve interface with the outlet, and a second connector coupling the second valve interface with the outlet;
wherein the first valve interface is received within the first valve receiving cavity of the upper support, the second valve interface is received within the second valve receiving cavity of the upper support, the outlet is received within the outlet cavity of the upper support, the first connector is received within the first channel of the upper support, and the second connector is received within the second channel of the upper support;
a hot water shank including a retaining portion and a downwardly extending connection portion;
a cold water shank including a retaining portion and a downwardly extending connection portion; and
a metallic lower base coupled to the upper support, wherein the retaining portion of the hot water shank, the retaining portion of the cold water shank, the first valve interface, and the second valve interface are secured intermediate the lower base and the upper support.

2. The centerset faucet of claim 1, further comprising a first insert received within the first valve receiving cavity above the first valve interface, and a second insert received within the second valve receiving cavity above the second valve interface, each of the inserts being formed of a metal and including a plurality of external threads positioned above the upper support.

3. The centerset faucet of claim 2, wherein the first insert and the second insert are press fit within the upper support, each of the first insert and the second insert include at least one flat cooperating with the upper support to prevent relative rotation between the first insert and the upper support, and the second insert and the upper support.

4. The centerset faucet of claim 2, further comprising a first o-ring intermediate the first insert and the first valve interface, and a second o-ring intermediate the second insert and the second valve interface.

5. The centerset faucet of claim 2, wherein the first valve interface is configured to sealingly engage a hot water valve cartridge, and the second valve interface is configured to sealingly engage a cold water valve cartridge.

6. The centerset faucet of claim 5, further comprising a bonnet nut configured to engage the external threads of the first insert to secure the hot water valve cartridge to the first valve interface, and a second bonnet nut configured to engage the external threads of the second insert to secure the cold water valve cartridge to the second valve interface.

7. The centerset faucet of claim 1, wherein:
the upper support includes a bottom lip; and
the lower base includes a lower wall positioned below the bottom lip of the upper support and a reentrant edge formed over the bottom lip of the upper support to secure the base to the upper support.

8. The centerset faucet of claim 1, further comprising a delivery spout mounted to the upper support, and a plurality of fasteners extending upwardly through the lower base and the upper support to couple the delivery spout thereto.

9. The centerset faucet of claim 1, wherein:
the retaining portion of the hot water shank includes an arcuate flange, and the downwardly extending connection portion of the hot water shank includes a cylindrical tube including a plurality of external threads;
the retaining portion of the cold water shank includes an arcuate flange, and the downwardly extending connection portion of the cold water shank includes a cylindrical tube including a plurality of external threads;
a first nut threadably engaging the external threads of the retaining portion of the hot water shank to secure the upper support to a mounting deck; and a second nut threadably engaging the external threads of the retaining portion of the cold water shank to secure the upper support to a mounting deck.

10. A centerset faucet comprising:

an upper support formed of a polymer and including a bottom lip;

a waterway including a cold water supply tube, a hot water supply tube, an outlet, a cold water connector fluidly coupling the cold water supply tube with the outlet and received within the upper support, and a hot water connector fluidly coupling the hot water supply tube with the outlet and received within the upper support; and a lower base formed of a metal and coupled to the upper support, the lower base including a lower wall positioned below the bottom lip of the upper support, and a reentrant edge formed over the bottom lip of the upper support to secure the lower base to the upper support.

11. The centerset faucet of claim 10, further comprising:

a hot water shank including a retaining portion and a downwardly extending connection portion; and a cold water shank including a retaining portion and a downwardly extending connection portion;

wherein the retaining portions of the hot water shank and the cold water shank are secured intermediate the lower wall of the lower base and the upper support.

12. The centerset faucet of claim 11, wherein:

the retaining portion of the hot water shank includes an arcuate flange, and the downwardly extending connection portion of the hot water shank includes a cylindrical tube including a plurality of external threads; and the retaining portion of the cold water shank includes an arcuate flange, and the downwardly extending connection portion of the cold water shank includes a cylindrical tube including a plurality of external threads.

13. The centerset faucet of claim 12, further comprising a first nut threadably engaging the external threads of the retaining portion of the hot water shank to secure the support to a mounting deck, and a second nut threadably engaging the external threads of the retaining portion of the cold water shank to secure the support to a mounting deck.

14. The centerset faucet of claim 10, wherein:

the upper support includes a first valve receiving cavity, a second valve receiving cavity, an outlet cavity, a first channel connecting the first valve receiving cavity and the outlet cavity, and a second channel connecting the second valve receiving cavity and outlet cavity;

the waterway includes a first valve interface, and a second valve interface, the cold water connector coupling the first valve interface with the outlet, and the hot water connector coupling the second valve interface with the outlet; and the first valve interface is received within the first valve receiving cavity of the upper support, the second valve interface is received within the second valve receiving cavity of the upper support, the outlet is received within the outlet cavity of the upper support, the cold water connector is received within the first channel of the upper support, and the hot water connector is received within the second channel of the upper support.

15. The centerset faucet of claim 14, further comprising a first insert received within the first valve receiving cavity above the first valve interface, and a second insert received within the second valve receiving cavity above the second valve interface, each of the inserts being formed of a metal and including a plurality of external threads positioned above the upper support.

16. The centerset faucet of claim 15, wherein the first insert and the second insert are press fit within the upper support, each of the first insert and the second insert including at least one flat cooperating with the upper support to prevent relative rotation between the first insert and the upper support, and the second insert and the upper support.

17. The centerset faucet of claim 15, further comprising a first o-ring intermediate the first insert and the first valve interface, and a second o-ring intermediate the second insert and the second valve interface.

18. The centerset faucet of claim 14, wherein the first valve interface is configured to sealingly engage a hot water valve cartridge, and the second valve interface is configured to sealingly engage a cold water valve cartridge.

19. The centerset faucet of claim 10, further comprising a delivery spout mounted to the upper support, and a plurality of fasteners extending upwardly through the lower base and the upper support to couple the delivery spout thereto.

20. A method of forming a centerset faucet, the method comprising the steps of:

providing an upper support formed of a polymer;

coupling first and second inserts within first and second valve receiving cavities of the upper support;

inserting a waterway from below the upper support, the waterway including first and second valve interfaces received within the first and second inserts;

placing first and second shanks below the waterway; and securing a lower base to the upper support by forming an edge of the lower base around a bottom lip of the upper support, wherein retaining portions of the shanks are captured between the lower base and the upper support.

21. The method of claim 20, wherein the lower base is stamped from a metal sheet.

22. The method of claim 20, wherein the securing step comprises forming the edge of the lower base by a press to define a reentrant edge around the bottom lip of the upper support and extending parallel to a lower wall of the lower base.

* * * * *